United States Patent [19]

Williams

[11] 4,342,559
[45] Aug. 3, 1982

[54] DRIVE SYSTEM
[75] Inventor: Robert N. Williams, Salt Lake City, Utah
[73] Assignee: National Technology Corporation, Salt Lake City, Utah
[21] Appl. No.: 132,996
[22] Filed: Mar. 24, 1980

Related U.S. Application Data

[63] Continuation-in-part of Ser. No. 870,427, Jan. 18, 1978, abandoned.

[51] Int. Cl.³ ............................................. F16H 55/30
[52] U.S. Cl. ...................................... 474/50; 474/47; 474/49; 474/53
[58] Field of Search ...................... 474/47, 49, 50, 51, 474/53, 54, 55, 56, 57; 280/236, 238, 261

[56] References Cited

U.S. PATENT DOCUMENTS

| 663,928 | 12/1900 | Pratt | 474/57 |
| 672,962 | 4/1901 | Seymour | 474/53 |
| 1,496,032 | 6/1924 | Sleeper | 474/50 |
| 1,662,654 | 3/1928 | Abbott | 474/42 |
| 1,792,921 | 2/1931 | Newhouse | 474/251 |
| 2,176,335 | 10/1939 | Gray | 474/175 |
| 2,603,978 | 7/1952 | Gaisset | 474/57 |
| 3,850,045 | 11/1974 | Hagen | 474/56 |
| 3,916,705 | 11/1975 | Smith | 474/31 |
| 3,935,751 | 2/1976 | Lee | 474/50 |
| 3,956,944 | 5/1976 | Tompkins | 474/50 |
| 3,969,948 | 7/1976 | Pipenhagen, Jr. | 474/50 |
| 3,995,508 | 12/1976 | Newell | 474/50 |
| 4,030,373 | 6/1977 | Leonard | 474/53 |
| 4,068,539 | 1/1978 | Nye | 474/50 |
| 4,092,870 | 6/1978 | Giometti | 74/7 R |
| 4,129,044 | 12/1978 | Erickson | 474/55 |

FOREIGN PATENT DOCUMENTS

| 75988 | 6/1953 | Denmark | 74/217 B |
| 801874 | 1/1951 | Fed. Rep. of Germany | 74/230.18 |
| 926948 | 4/1955 | Fed. Rep. of Germany | 74/244 |
| 571171 | 5/1924 | France | 280/236 |
| 786447 | 9/1935 | France | 74/230.22 |
| 919661 | 3/1947 | France | 74/244 |
| 961243 | 5/1950 | France | 74/244 |
| 961520 | 5/1950 | France | 474/56 |
| 978916 | 4/1951 | France | 74/230.18 |
| 981230 | 5/1951 | France | 74/217 B |
| 1004860 | 4/1952 | France | 474/56 |
| 425854 | 10/1947 | Italy | 74/244 |
| 460309 | 11/1950 | Italy | 74/244 |
| 469486 | 3/1952 | Italy | 474/53 |
| 17715 | 2/1928 | Netherlands | 74/217 CV |
| 12398 | of 1894 | United Kingdom | 474/59 |
| 21122 | of 1897 | United Kingdom | 474/54 |
| 17153 | of 1901 | United Kingdom | 474/56 |
| 159790 | 6/1920 | United Kingdom | 474/58 |
| 1441054 | 6/1976 | United Kingdom | 74/230.5 |

Primary Examiner—Leslie Braun
Attorney, Agent, or Firm—Robert R. Finch

[57] ABSTRACT

A load-responsive variable diameter pulley in a drive system using a driving pulley and a driven pulley functionally connected by a belt. The basic pulley assembly includes two spaced apart parallel sideplates concentric to a hub. One plate is fixed to the hub while the other is movable angularly about the pulley axis relative to the fixed plate. Slots are provided in the surfaces of both plates and a plurality of arcuate belt-engaging segments located between the plates are provided with laterally extending pins that are received in the slots. In the basic pulley a spring normally urges the movable plate to bias it and belt-engaging segments to the position defining maximum pulley diameter. The slots in the fixed plates are in pairs and the individual slots are not parallel to each other. The slots are designed so that the chord of the effective arc of the arcuate segment guided in the slots is always perpendicular to a radius of the pulley. Pattern and/or speed of response may be adjusted by change in configuration of the slots. In one drive system wherein the basic pulley is combined with a smaller pulley as in a bicycle drive, no spring is provided in the small pulley so it will normally be at minimum diameter, but such diameter will increase automatically with any decrease in diameter of the basic pulley.

10 Claims, 44 Drawing Figures

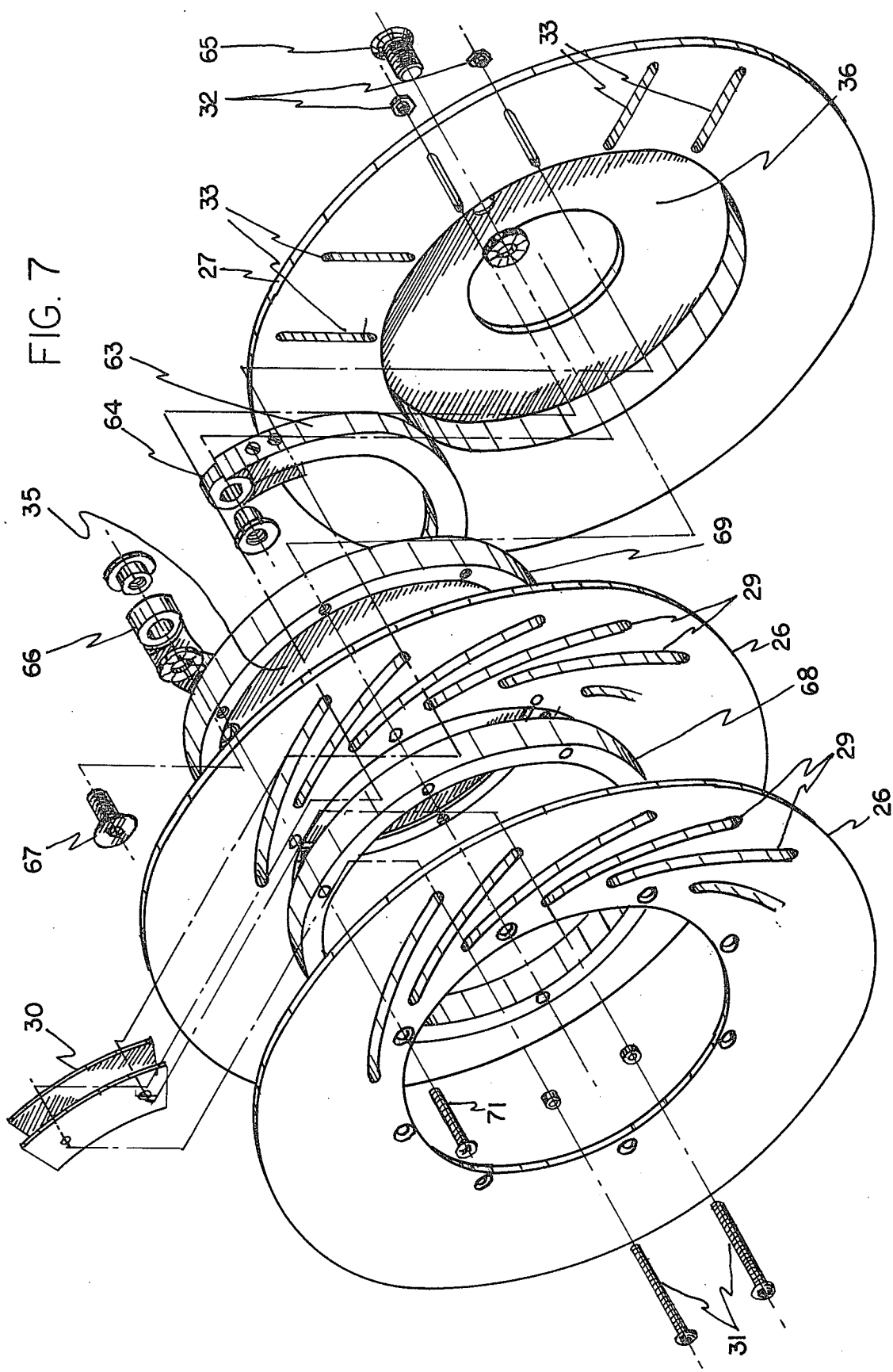

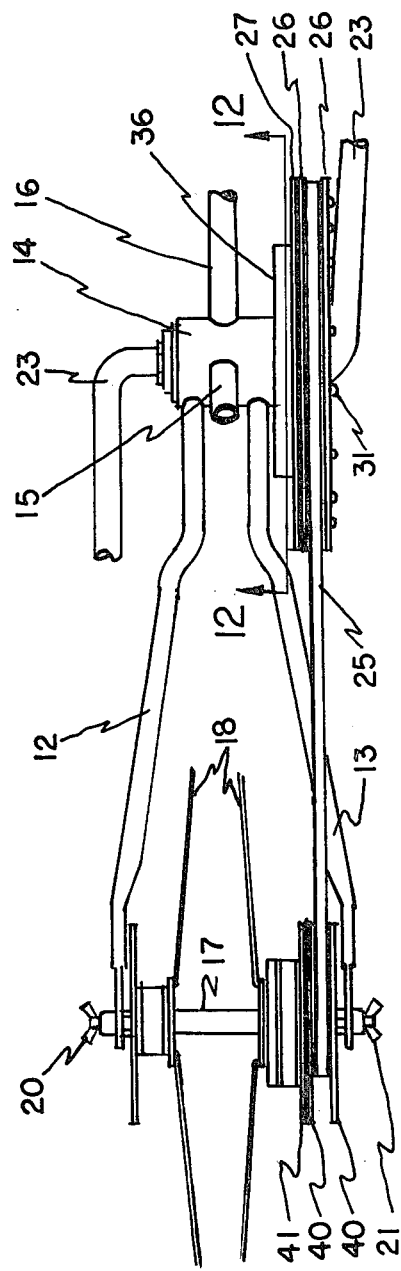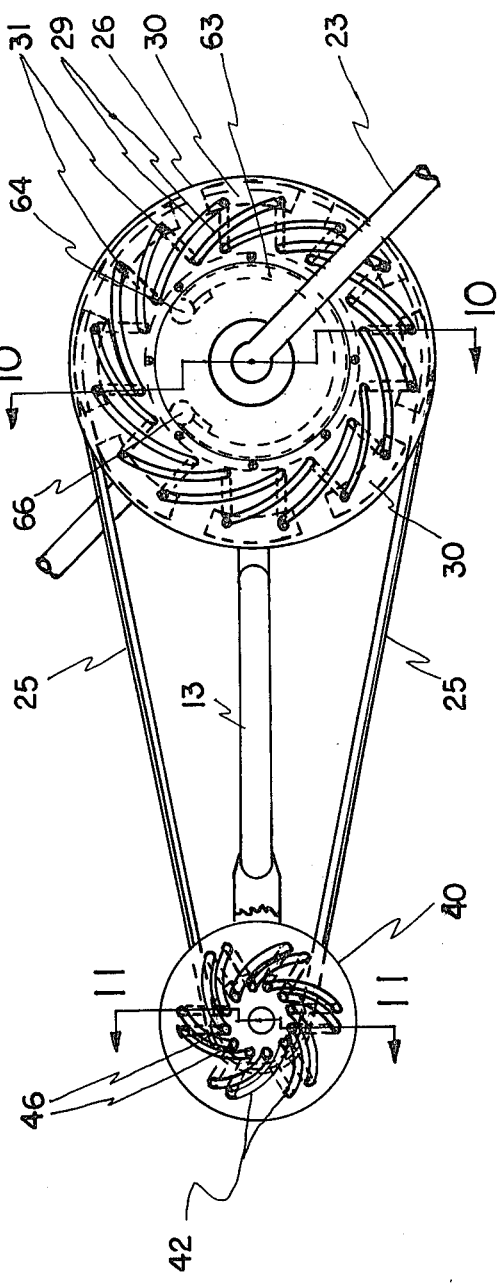

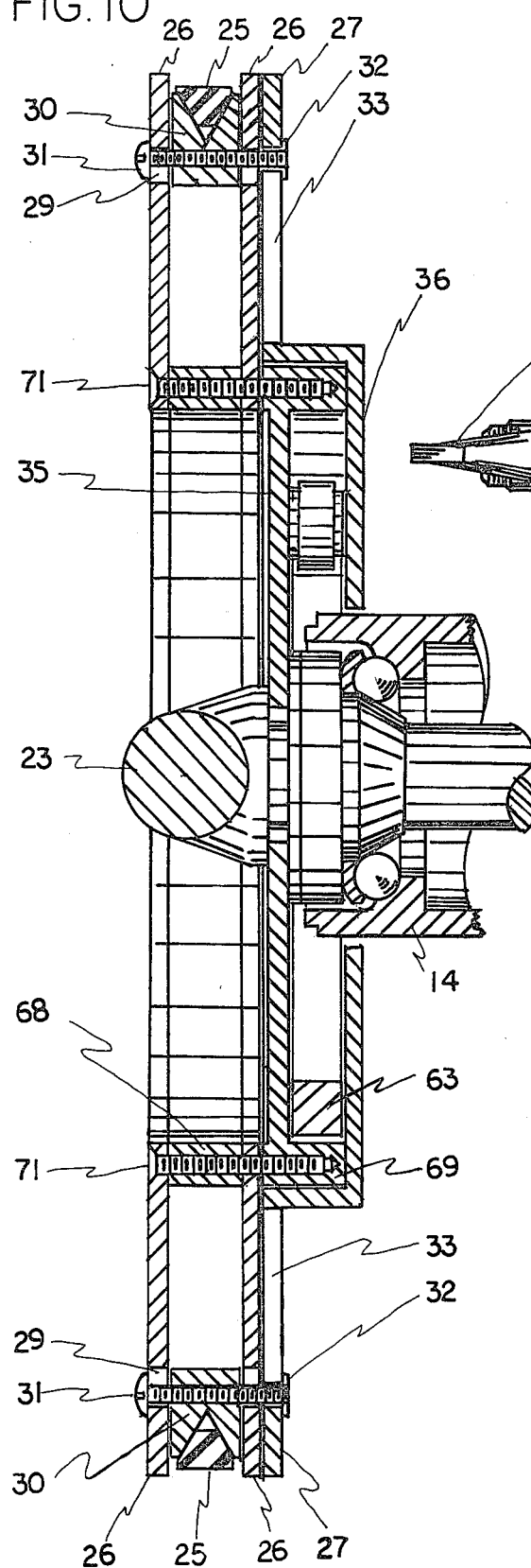
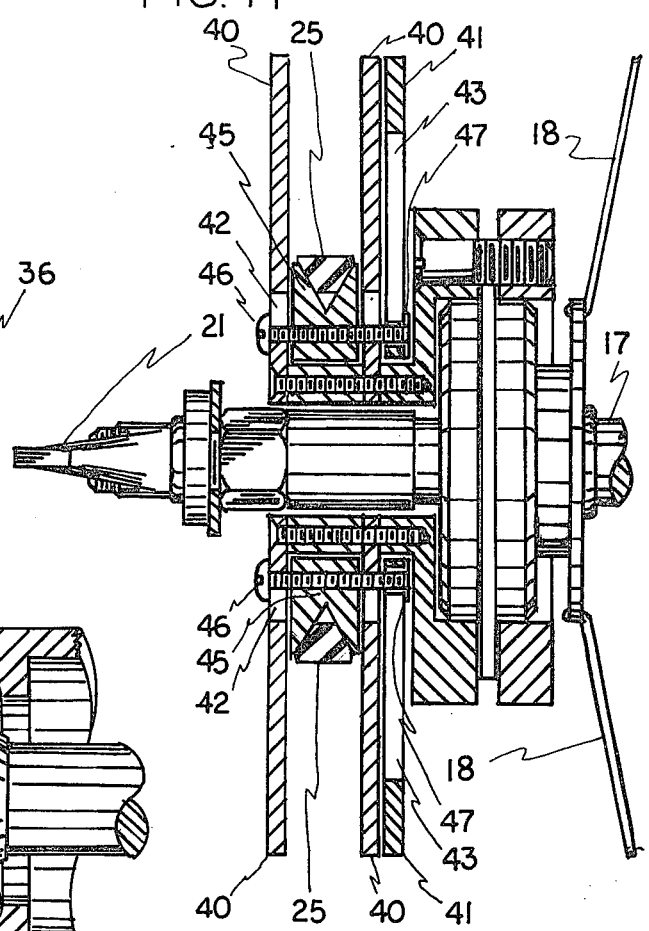
FIG. 10
FIG. 11

FIG. 12
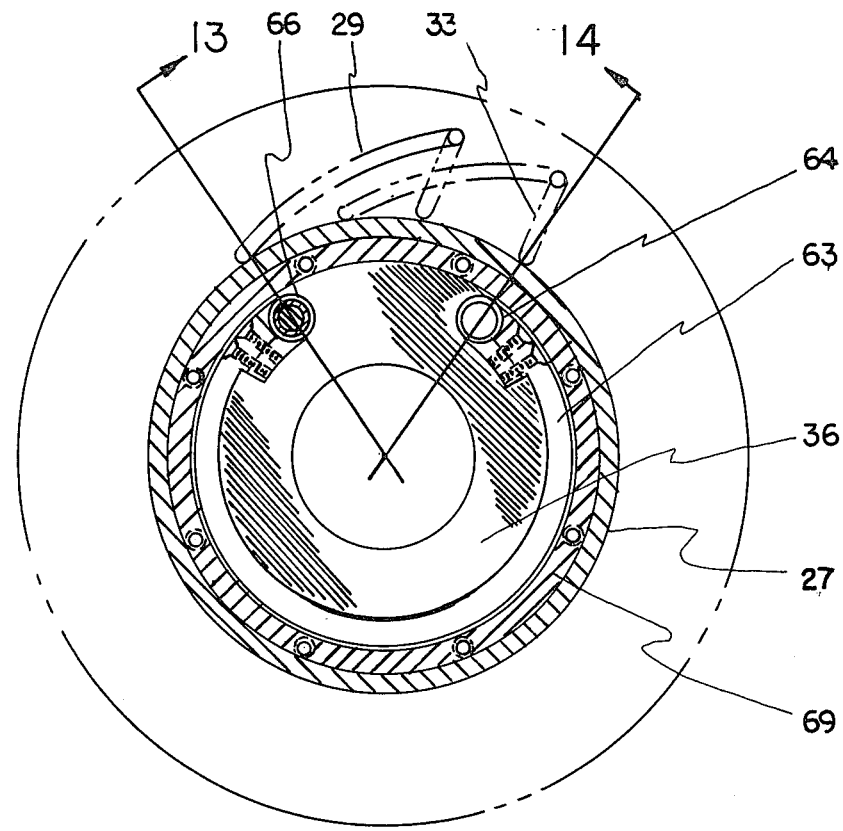
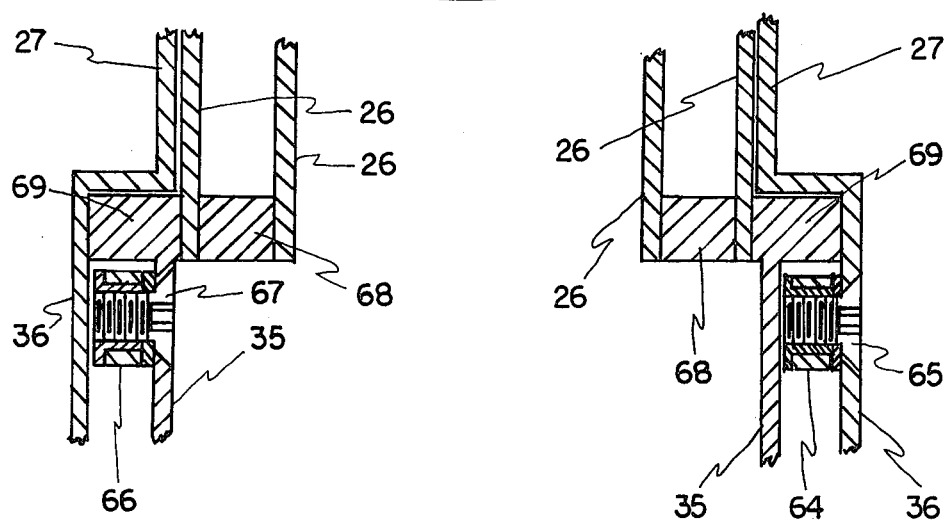
FIG. 13
FIG. 14

DRIVE SYSTEM

RELATED APPLICATION

This is a continuation-in-part of my earlier filed copending application Ser. No. 870,427, filed Jan. 18, 1978, now abandoned, for Drive System.

In my earlier application I disclosed and claimed a variable diameter pulley in which the pulley diameter varied in infinite increments between minimum and maximum diameter in response to load changes imposed by the driven element. As disclosed and claimed in said earlier application, the pulley assembly comprises a hub, a pair of parallel sideplates mounted concentric to the hub, a first one of the sideplates is fixed to the hub and the second one of the sideplates is movable about the hub or pulley axis relative to the first sideplate. Since the first sideplate is fixed to the hub it is often referred to in this specification as a fixed plate, while the second sideplate is often referred to as the movable plate. Also, the slots may be referred to as cams and the pins as cam followers. A plurality of pairs of curved slots (cams), are provided in the fixed plate surface and an equal number of pairs of straight slots (cams), are provided in the movable plate. A plurality of arcuate belt-engaging segments are located between the plates and two pins (cam followers), extend from each side of each segment and are received in an appropriate one of the slots. The slots in the fixed plate are curved and arranged so that relative movement between plates causes the segment to follow the slots to effect a net radial movement of the segment. In the basic pulley assembly, a spring or other resilient means normally urges the movable plate to the limit of its relative motion in a direction that positions the belt-engaging segments to define maximum pulley diameter. Increased belt tension resulting from greater load causes the arcuate segments to follow the curves toward the hub thus reducing pulley diameter and belt speed with a consequent change in power ratio. My said earlier application also disclosed and claimed a drive system in which two variable diameter pulleys connected by a belt were utilized whereby when the larger pulley, driven by a crank and pedal, was subjected to increased load it underwent a reduction in diameter, with an automatic proportionate increase in diameter of the smaller driven pulley on the bicycle wheel. The net effect is that the ratio of diameter of the driving pulley to that of the driven pulley was changed.

The present application contains all the subject matter of my earlier application along with amplification and clarification of such subject matter. Additionally, I disclose and claim in this continuation-in-part application, an improved spring and arrangement thereof for urging the movable plate normally into position whereby the arcuate segments define maximum pulley diameter. Also, I disclose and claim herein ways and means for selecting and achieving distinct patterns of power and speed variations, for instance, there may be definite automatic shifting sequences and/or dwell at selected speed levels.

TECHNICAL FIELD

This invention relates to variable diameter pulleys and drive systems incorporating at least two such pulleys interconnected by an endless belt. More particularly, the invention is directed to a load responsive pulley that automatically reduces in diameter in response to increased belt tension and increases diameter in response to easing of belt tension thus changing the speed and power ratios between driving and driven pulleys to accommodate load changes.

BACKGROUND OF THE INVENTION

Drive systems utilizing pulleys or sprockets and flexible draft means such as chains or belts trained thereabout are well known. It is equally well known to provide for changes in the diameter of either or both the driving or driven pulley to accommodate changes in imposed load. In bicycles, the most commonly used variable speed/output drive requires a plurality of driving sprockets at both the crank and driven wheel. A shifting mechanism changes the chain from sprocket to sprocket. Although this system is in wide use, it does suffer from the disadvantages, inter alia, that (1) the shifting is not automatic but requires deliberate effort by the operator; (2) the chains often slip off the sprockets causing much inconvenience; and (3) the several speeds and power ratios available are fixed and may or may not be optimum for a given situation.

Various devices have been proposed to provide a load responsive system to automatically vary the driving sprocket diameter in response to load changes. One such arrangement, as described in U.S. Pat. No. 3,995,508 utilizes a driving sprocket assembly comprising a pair of spaced apart plates mounted on a hub. One plate is fixed to and rotates with the hub while the other is free to rotate about the hub axis. The fixed plate is provided with a plurality of spiral slots while the movable plate has an equal number of straight radially extending slots. A plurality of small sprockets are carried between the plates and each sprocket is provided with laterally extending elements, such as pins that are received in the slots. A spring co-acts between the plates urging them to the relative angular position that moves the sprockets farthest from the hub to define maximum effective sprocket diameter. In such prior arrangement, increased load forces the pins and sprockets to follow the slots toward the hub thus reducing sprocket diameter. In the arrangement described, the resulting chain slack is taken up by a separate take-up device. Although the device described appears generally to be workable, it suffers from the disadvantages that it is limited to a chain and is not adaptable to belts. Chains are undesirable due to initial as well as replacement cost, and also because they frequently malfunction due to failure to engage the sprockets precisely. Moreover, the range of speed and power ratio change is limited since the diameter of the small sprocket is fixed.

Systems have also been proposed utilizing belts which are desirable because they are relatively inexpensive, require little or no maintenance and, even more importantly, are not required to engage sprocket teeth hence will not jump off the pulley, but will maintain continuous contact. An early belt driven system, as described in U.S. Pat. No. 672,962, employs a pulley having a pair of spaced-apart plates fixed to a hub and at least one other plate rotatable relative to the hub and fixed plate. There is a plurality of spirally curved slots in the fixed plate and an equal number of straight radial slots in the movable plate. Arcuate belt-engaging segments between the plates have laterally extending guides that are received in the slots and mechanical means rotate the plates manually to move the segments and vary the pulley diameter. This system is not automatic. Also, the belt-to-pulley contact is erratic because the arcuate segments tend to roll in the direction of belt travel. Additionally, the rolling or tilting of the segments causes the segment guides to bind in the straight radial slots thus seriously hampering operation of the entire drive.

Another proposal, as disclosed in British Pat. No. 159,790, utilizes a pulley assembly that has a fixed and a movable plate mounted concentric to a hub. Each plate is provided with a plurality of pairs of parallel spirally extending curved slots. The curves of the two plates are identical, but extend in opposite directions. Arcuate belt-engaging segments are positioned between the plates, each segment being provided with pins that are received in the slots in both plates. The pulley diameters cannot vary automatically. Instead, complex means are provided to manually adjust the relative angular positions of the plates to effect radial movement of the segments. The structure requires parallel slots which cannot guide the segments radially except with pronounced tilting or rolling which reduces belt-to-pulley contact.

In summary, of the several prior arrangements described above, only the manually shiftable multiple sprocket chain drive has enjoyed any success. The load responsive chain and sprocket drive disclosed in patent 3,995,508 apparently suffers from the disadvantages of frequent misengagement of sprocket and chain while the prior belt and pulley arrangements do not and cannot provide sufficient and reliable belt-to-pulley contact throughout their range of operations for acceptable operation.

BRIEF DESCRIPTION OF THE INVENTION

It is the principal object of the present invention to provide a belt-engaging pulley the diameter of which is variable automatically in response to various tension loads imposed thereon yet presents for belt engagement a maximum, uniform and predictable area over its entire range.

Another object is the provision of a load-responsive pulley of the type described in which a variety of patterns of the speed and power ratios may be achieved.

An important related object is the provision of a pulley of the type described in which the rate of change and force requirements therefor may be predetermined by selection of spring strength and slot configuration.

Still another object is provision of a load-responsive variable diameter pulley in which arcuate belt-engaging segments move smoothly through a variety of patterns, including steps or dwells and/or infinite positions yet achieve a net radial movement relative to the pulley axis.

A further object is the provision, in a variable diameter pulley of the type described, of an improved spring for normally maintaining the pulley at maximum effective diameter.

Another related object is provision of an automatic load-responsive drive system incorporating two variable diameter pulleys functionally connected by an endless belt trained thereabout.

In accordance with the invention, the foregoing and probably other objects are achieved by a pulley assembly having a hub, a pair of spaced-apart plates mounted thereon, one of said plates being fixed to the hub and the other mounted for rotational movement thereabout relative to the fixed plate, each plate has cam slots formed therein for controlling and guiding arcuate belt-engaging segments positioned between the plates which segments have outwardly extending cam follower pins received in said cam slots and a spring, or other resilient means, co-acting between the fixed and movable plates normally to urge the arcuate segments along the slots to maximum pulley diameter.

Also in accordance with the invention, a drive system is presented employing two variable diameter pulleys functionally connected by an endless belt trained successively thereabout. In an embodiment especially useful on bicycles the driven pulley in the rear wheel is relatively small compared to the pedal-operated driving pulley and there is no spring co-acting between plates of the small pulley.

My invention is predicated on the basic discovery that the slot configuration must be selected, empirically if necessary, so that the arcuate segments always bear the same geometric relationship to a radius of the pulley throughout the entire range of pulley diameter. In accordance with this requirement, the chord of each arcuate segment must always be normal to a radius of the pulley. To achieve this, the invention requires pairs of slots, at least in the fixed plate, that are coordinated with the cam follower pins on the arcuate segments to maintain the normal relationship throughout the travel. It is a requirement that the individual slots of each pair of slots in the fixed plate not be parallel to each other. Thus, curved slots of the pairs in the fixed plate are non-concentric.

As will become more apparent, the invention also provides the ability to select from an infinite variety of patterns for speed and power ratio variations.

In accordance with another feature of the invention, a horseshoe-shaped spring is mounted to interact between the fixed plate and the movable plate to bias them toward that relative angular displacement which provides maximum pulley diameter.

BRIEF DESCRIPTION OF THE DRAWINGS

In order that the invention may be more readily understood and carried into effect, reference is made to the accompanying drawings and description thereof which are offered by way of example only and not in limitation of the invention, the scope of which is defined by the appended claims, including equivalents thereof, rather than any preceding description.

In the drawings:

FIG. 7 is an exploded view of a modification of the pulley illustrated in FIGS. 1-4 and in which two essentially identical sideplates 26 are employed to provide increased stability.

FIG. 8 is a view similar to FIG. 1 illustrating a drive embodying the modified pulley illustrated in FIG. 7.

FIG. 9 is a side view of the drive shown in FIG. 8 with some parts omitted and others shown in dotted lines for clarity.

FIG. 10 is a sectional view taken in the plane of line 10—10 of FIG. 9 looking in the direction of arrows 10.

FIG. 11 is a sectional view taken in the plane of line 11—11 of FIG. 9 looking in the direction of arrows 11.

FIG. 12 is a sectional view taken in the plane of line 12—12 of FIG. 8 illustrating in detail the horseshoe spring biasing the fixed and movable plates to that angular displacement which results in maximum pulley diameter.

FIG. 13 is a sectional view taken in the plane of line 13 of FIG. 12 looking in the direction of arrow 13.

FIG. 14 is a sectional view taken in the plane of line 14 of FIG. 12 looking in the direction of arrow 14.

DETAILED DESCRIPTION OF THE DRAWINGS

Figure 1:
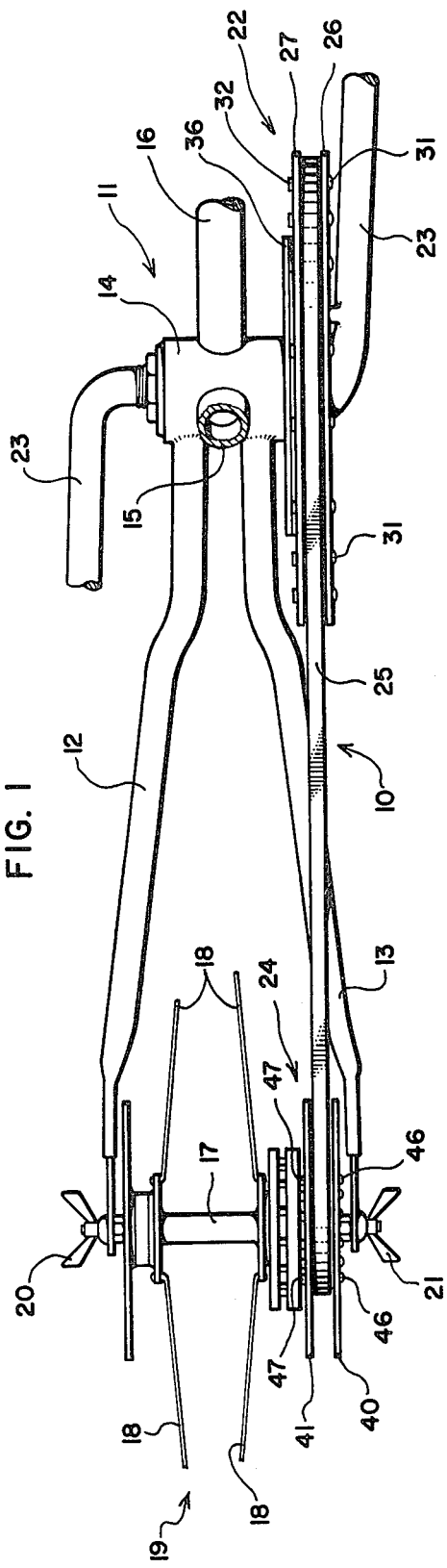
FIG. 1 is a partial top view of a bicycle having a drive system embodying the invention.
Figure 2:
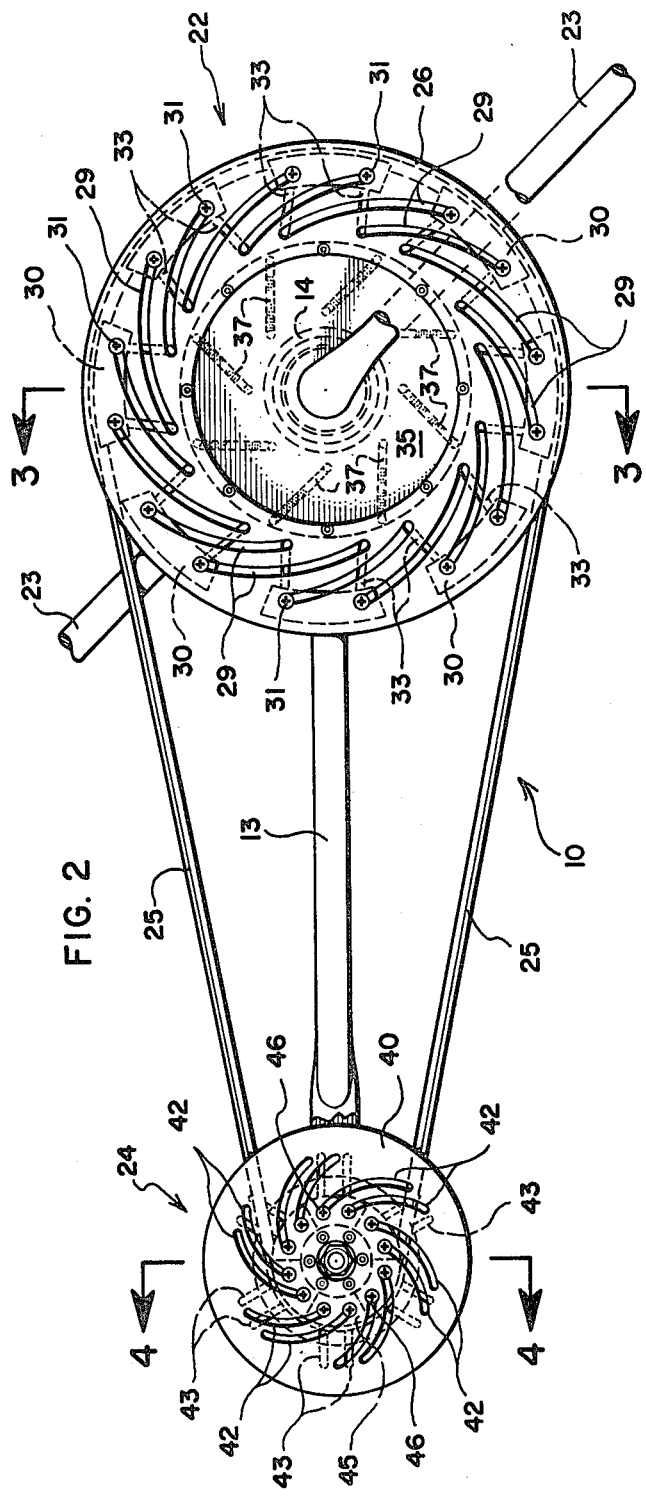
FIG. 2 is side view of the drive shown in FIG. 1 some parts being omitted and some hidden parts shown in dotted lines, all for purposes of clarity.
Figure 3:
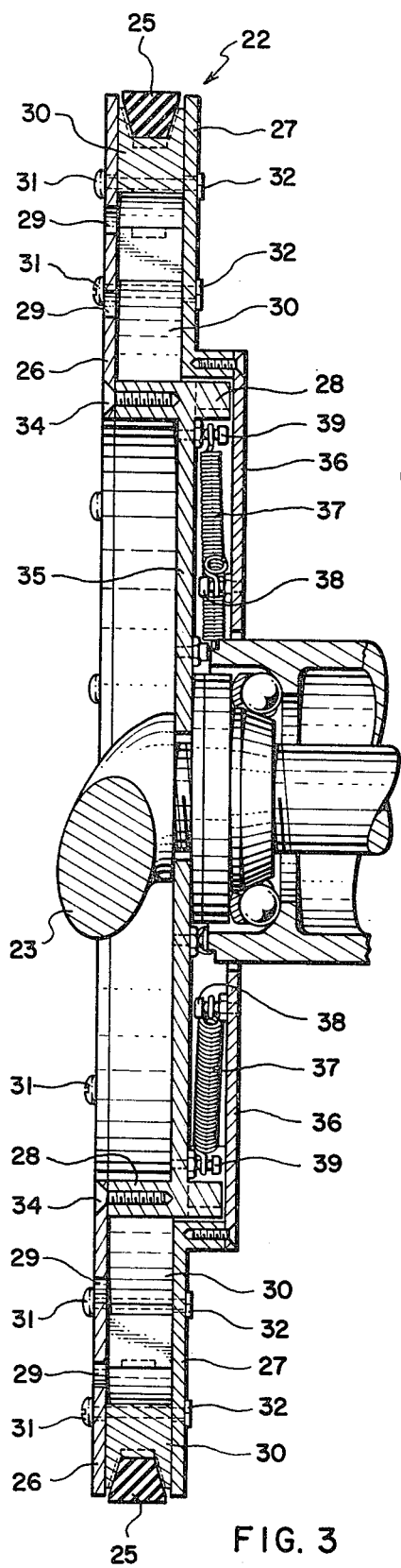
FIG. 3 is an enlarged sectional view taken in the plane of line 3—3 of FIG. 2 and looking in the direction of arrows 3.

FIGS. 1-5 illustrate a preferred embodiment of the pulley of the invention as well as a bicycle drive system embodying the invention.

As illustrated, the drive system, designated generally 10, is mounted on a bicycle 11 which is shown fragmentarily and includes chain stays or rear wheel supports 12 and 13, bottom bracket or crank assembly housing 14, seat tube 15, down tube 16, a rear wheel axle 17 and a wheel 19 having usual spokes 18, the wheel being fixed to the frame by usual wing nuts 20 and 21.

The drive system includes a variable diameter pulley assembly 22 secured to and rotatable with a crank 23. The crank may be of any conventional design and will, if in a bicycle, include pedals, a hub, and a transverse portion extending through the crank assembly housing 14. The drive also includes a relatively smaller variable diameter pulley assembly 24 secured to and rotatable with the rear wheel. An endless V belt 25 is trained about the two pulleys. In the drive as illustrated, the small variable diameter pulley not only contributes to enhanced operation of the drive but acts as a belt slack take-up device. If desired, to accommodate special conditions, the small pulley may be replaced with a fixed diameter pulley and a separate belt slack take-up device provided. However, such an arrangement is not the equivalent of the illustrated drive system embodiment. Rather, it is a modification useful under different conditions.

The load responsive variable diameter pulley 22 comprises spaced apart plates 26 and 27. One plate 26 is fixed to the crank 23 by means of an integral central support plate 35 which is in turn secured to the crank 23 adjacent one end of the crank assembly housing 14 by a typical cone. The cone is referred to herein as a hub. The other plate 27 is mounted for relative angular motion about the extended annular section 28 of the support plate 35 and, of course, about the axis of the pulley and hub.

A central support plate 36 is secured to the movable plate 27 in spaced relationship to the central support plate 35 thereby to define an enclosure for a spring. The extended annular section 28 provides bearing surfaces for the movable plate 27 and the support plate 36. It also ensures spacing between support plates 35 and 36.

For controlling net radial movement of the belt-engaging segments 30, curved slots (cams) 29 are provided in the surface of the fixed plate 26. Cam follower pins 31 extend laterally from opposite sides of the segment and are received in the slots. The slots 29 are arranged in pairs—one pair for each segment. As noted, the individual curved slots, although of similar configuration need not be identical and cannot be parallel to each other. To predetermine the amount of angular movement and thus the amount of overload needed to effect change in the pulley diameter straight slots 33 are provided in the movable plate 27. The pins 31 which extend through the arcuate segments are received in the slots 33. A flanged nut 32 may be used to hold the pins in place.

A plurality of coil springs 37 are connected between pins 38 on the central support plate 36 of the movable plate 27 and pins 39 on the central support plate 35 of the fixed plate 26. These springs bias the plates toward an angular displacement at which the arcuate segments are at the limit of their outward travel thus defining maximum diameter of the pulley 22.

The smaller variable diameter pulley 24 driving the rear wheel is similar in construction to pulley 22. It comprises spaced-apart fixed and movable plates 40 and 41, with pairs of curved slots (cams) 42 in the fixed plate 40 and straight slots (cams) 43 in the movable plate 41. Cam followers, formed as threaded pins 46 extending laterally from the arcuate segments 45 are received in the slots 42 and 43 respectively. A flanged nut 47 may be used to retain the pin in place.

Figure 5:
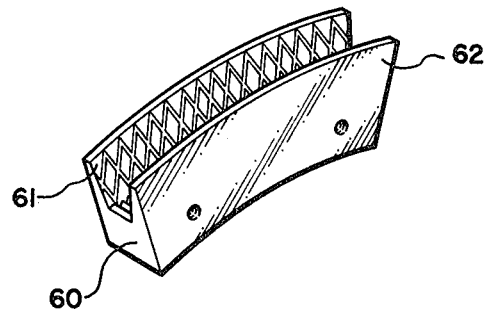
FIG. 5 is a pictorial view of one of the arcuate belt-engaging sectors employed in the invention.

As shown in FIG. 5 the arcuate belt-engaging segments 30 and 45, comprise a curved body 60 with upstanding sidewalls 61 and 62 the inner surfaces of which are slanted to accommodate a V belt and suitably roughened to enhance frictional engagement with the belt. Transverse holes are drilled through the segments to accommodate the pins 31 and 46. The belt-engaging segments for both pulleys are selected so that at minimum pulley diameter the segments come together to form a circular continuous belt-engaging surface. Obviously, as the segments move outwardly the surface becomes discontinuous, however, the total area of belt-engagement remains essentially the same. This is achieved in accordance with this invention by insuring that the chord of the segment is normal to a radius of the pulley. Thus the area of belt-engagement is always essentially uniform and definitely predictable.

Unlike pulley 22, the smaller pulley 24 does not have any spring biasing the components to maximum diameter. Instead, in the drive system shown, the taut belt 25 wraps around the pulley and the applied tension prevents the segments from moving outwardly in the slots.

When the large pulley is at maximum diameter and the small pulley at minimum diameter, as shown in FIGS. 1-4, the drive is in a normal load position. This is the position where greatest speed is achieved. It is also the position of minimum power output. When the diameter of the large pulley 22 decreases and/or the diameter of the small pulley 23 increases, a lower speed is transmitted to the wheel 19, but the power output is greater hence it is easier to climb a steep hill. In my drive, changes in pulley diameters and thus speed and power are achieved automatically. In operation, if the bicycle starts uphill, increased resistance is transmitted through the rear wheel 19, pulley 24 and belt 25—to the belt-engaging segments 30 on the large driving pulley 22. When the increased load overcomes the opposing force of springs 37, the belt pull on the segments will cause the cam follower pins 31, acting in slots 33 to effect rotation of the plate 27 against the urging of the springs 37. This causes the cam follower pins 31 to move also along the curved cams 29 in the fixed plate thus effecting a net inward radial movement of the belt-engaging segments and reducing pulley diameter. This movement stops when the resulting increased spring tension offsets the load. Whenever there is a reduction in diameter of the large pulley there will be a lessening of tension in the lower run of the belt. The reduced tension or slack permits the belt to pull the segments 45 outwardly in the slots thus increasing the diameter of the smaller pulley 24. The action of the two pulleys is proportional and, for all practical purposes, simultaneous. The result is a smooth effortless changing of speed and ability to handle varying loads. When all the slack or reduced belt tension disappears the diameter of both pulleys stabilizes until a further load variation is sensed.

In the illustrated embodiment, the smaller pulley does not require a spring because the belt will pull the sectors outwardly until all slack is taken up. A spring can be employed if desired for any reason, but it is not necessary for this application as the desired expansion and contraction of the rear pulley is achieved automatically in the drive assembly of the invention. A drive utilizing a spring on both pulleys to bias them toward maximum diameter is not the equivalent of that illustrated but is a separate modification useful under different conditions where, for instance, a smaller range of change can be tolerated.

Figure 6:
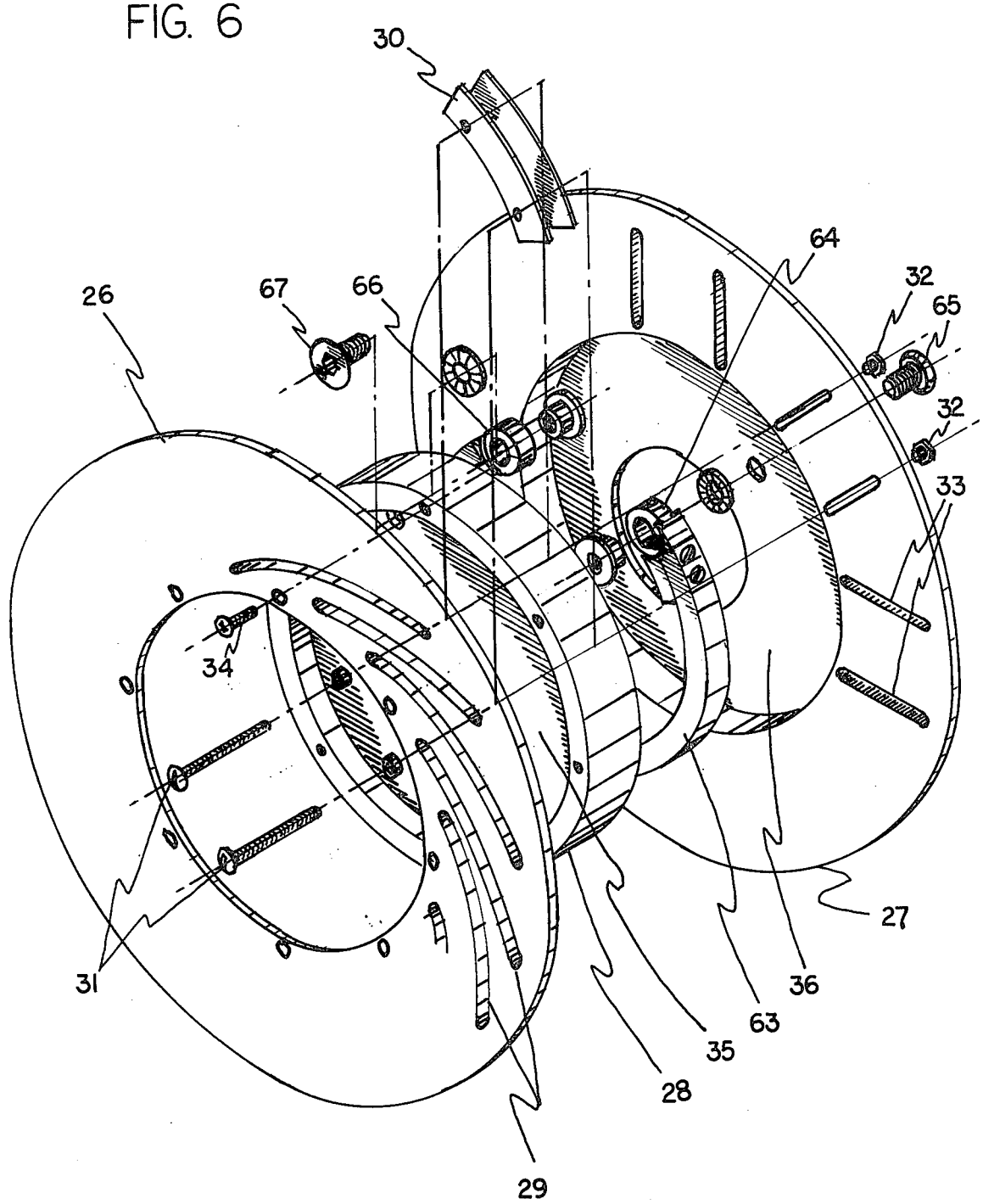
FIG. 6 is an exploded view of a pulley of the type illustrated in FIGS. 1-4 but embodying a modified spring arrangement.

FIG. 6 is an exploded view of a pulley similar to that shown in FIGS. 1-4, but with a modified spring and consequent changes in structure to accommodate such spring. Also, the crank assembly and housing are omitted. The pulley, as shown in FIG. 6, comprises a fixed plate 26, a movable plate 27, a central support plate 35 to which the fixed plate 26 is secured by suitable screws 34 to hold it in spaced-apart relationship to the movable plate 27.

A simple but strong horseshoe spring 63 is located in the recess defined between plates 35 and 36. One end-piece 64 of the spring is suitably secured, as by a machine screw 65 to the central support plate 36 of the movable plate 27 and at end piece 66 to the central support plate 35 of the fixed plate which is in turn connected by screws 34 to the fixed plate 26. The horseshoe spring is compact yet strong enough to affect the high torques encountered during operation of a bicycle. It replaces the several smaller springs 37 shown in FIGS. 1-4. The horseshoe spring is installed so that it is almost fully expanded whereby relative angular motion of plate 27 will force the spring ends toward each other. As in the pulley illustrated in FIGS. 1-4 the fixed plate 27 has curved cam slots 29 while the movable plate has straight cam slots 33, only a few of which are shown.

FIGS. 7-14 illustrate a modification of the pulley useful in situations where high forces are involved. The pulley is similar to that shown in FIG. 6 but includes a pair of identical fixed plates 26 held in spaced-apart relationship by a spacer 68. The two plates 26, the spacer and the central support plate 35 are all held together by suitable machine screws 71, threaded eventually into an annular member 69 integral to the support plate 35. The member 69 corresponds to the extension 28 of FIGS. 3 and 6. It is required that the two plates 26 be mounted so their cam slots are exactly aligned with each other. Then, when the segments 30 are in place the pins 31 will pass through the curved slots 29 in both of the plates 26 then through the straight slots 33 in the movable plate 27 which is mounted face to face and closely adjacent the inboard one of the fixed plates 26. A horseshoe spring 63 is connected to co-act between the fixed plate 26 and the movable plate 27 by securing its ends 64 and 66 to central support plates 35 and 36.

Figure 15A:
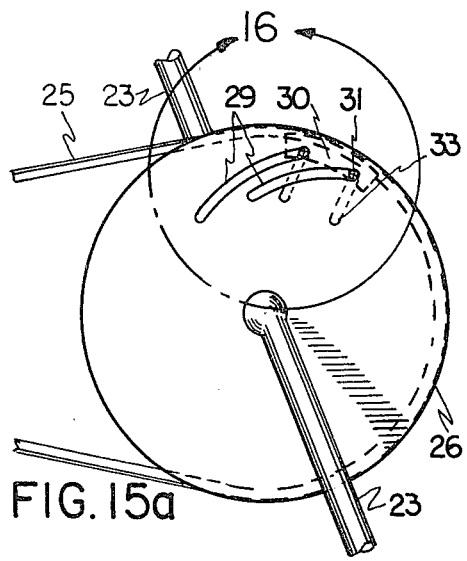
FIGS. 15a, 15b and 15c are views depicting three sequential positions of a pulley and certain parts thereof during operation, some parts are omitted and others shown in dotted lines for clarity. The pulley illustrated in FIGS. 15a, 15b and 15c has the curved cam slots in the fixed plate and straight cam slots in the movable plate as illustrated in FIGS. 1-2.
Figure 15B:
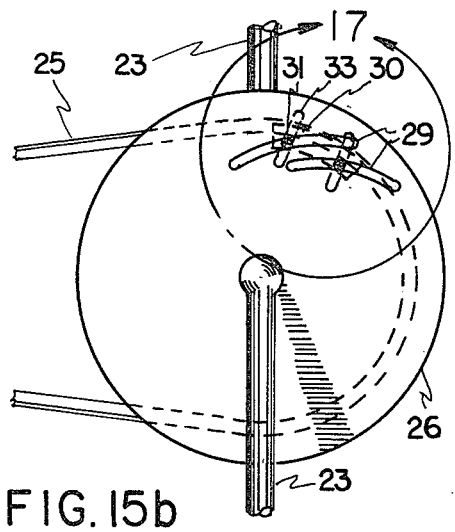
Figure 15C:
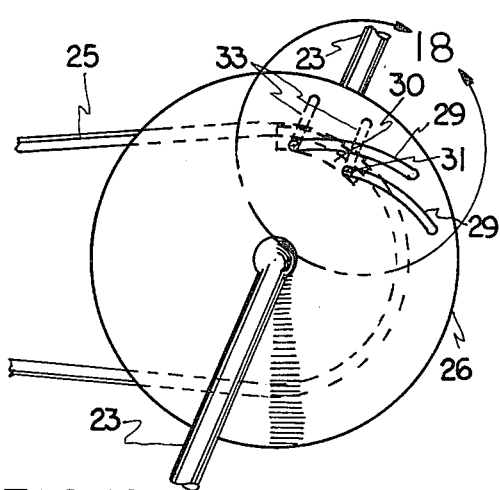

FIGS. 15a, 15b and 15c illustrate a sequence of operation of the pulley when an increased load is imposed thereon as when the bicycle climbs a hill. In the normal position, as shown in the FIG. 15a, the pulley is at maximum diameter. In FIG. 15b the crank and fixed plate have rotated about 22.5 degrees while the movable plate has rotated an equal amount in the opposite direction to crank rotation; and in FIG. 15c, the crank and fixed plate as well as the movable plate have rotated 45 degrees, a total relative displacement of 90 degrees; and the arcuate segments have moved to the innermost position. One end of the pins 31 on the arcuate segment follow the curved slots 29 in the plate 26 while the opposite ends follow the straight slots 33 in the movable plate 27. The head of the pins 31 and the flanged nuts 32 at the opposite end hold the pins in the slots. The net movement of the arcuate segment is radially inward thus decreasing the pulley diameter. In the bicycle drive system of the invention any decrease in the diameter of the large pulley automatically causes a proportionate increase in the diameter of the small pulley. The increase in the small pulley diameter is effected by the belt pulling on the segments whereby the pins 46 follow the curved slots 42 and straight slots 43 in the sideplates.

The changes in diameter of both pulleys will continue until the spring deflection has completely offset the increased load or the pins (cam followers) reach the end of slots (cams) whichever occurs first. In other words, the spring is deflected as it senses increased torque thereby effecting decrease in diameter of the large pulley. This results in a change in belt tension that causes an increase in the diameter of the small pulley. It will be appreciated that changes in belt tension are complex. The tension increases in upper or working run of the belt under increased load, but at the same time decreases on the lower run. Thus, there is some slack on the lower run. The combination of increased tension on the upper run and decreased tension on the lower run is what causes expansion of the small pulley. The amount of diameter increase being limited by tension of the belt when this limited slack is taken up. In any event, the maximum range of diameter changes if fixed by the length of the slots, the strength of the spring and/or the length of the belt.

Figure 16:
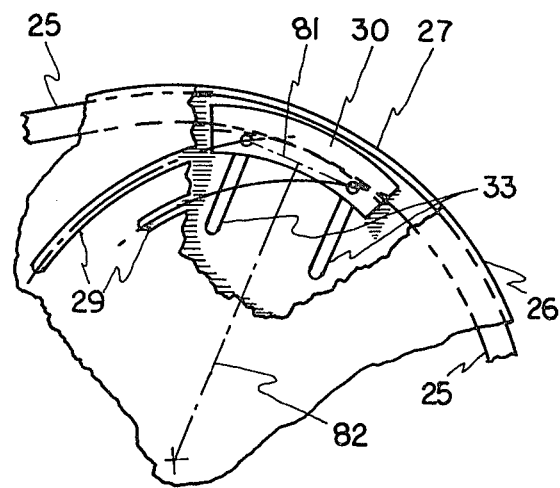
FIGS. 16-18 inclusive are enlarged partially cut away views of the portions enclosed respectively by lines 16, 17 and 18 of FIGS. 15a, 15b and 15c illustrating in greater detail relative movement of components during the operational sequence shown therein.
Figure 17:
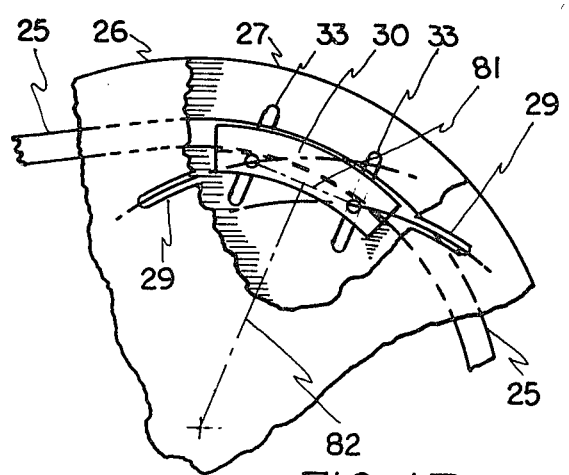
Figure 18:
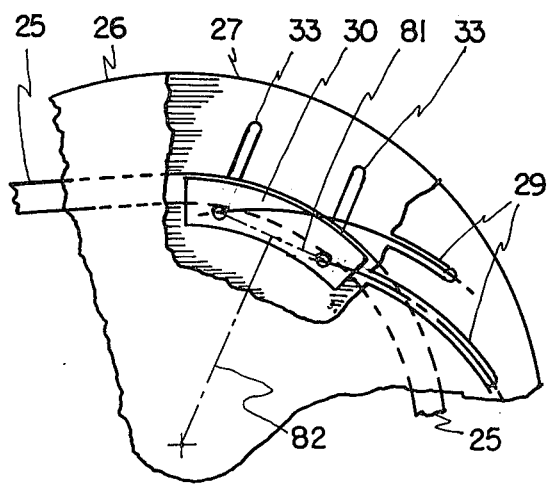
Figure 19A:
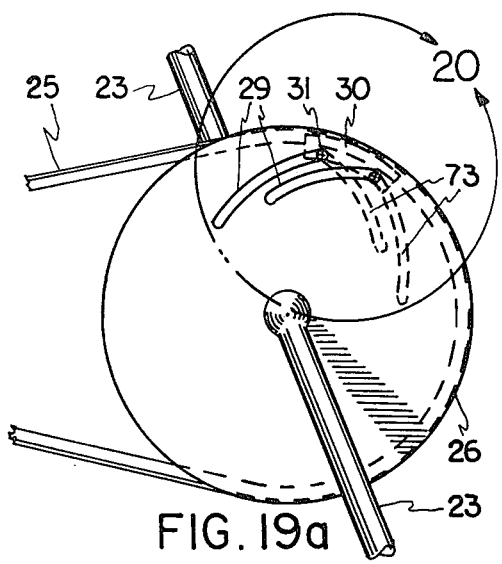
FIGS. 19a, 19b and 19c are views similar to FIGS. 15a, 15b and 15c, but show an operational sequence of a pulley in which the cam slots in both the fixed and movable plates are curved.
Figure 20:
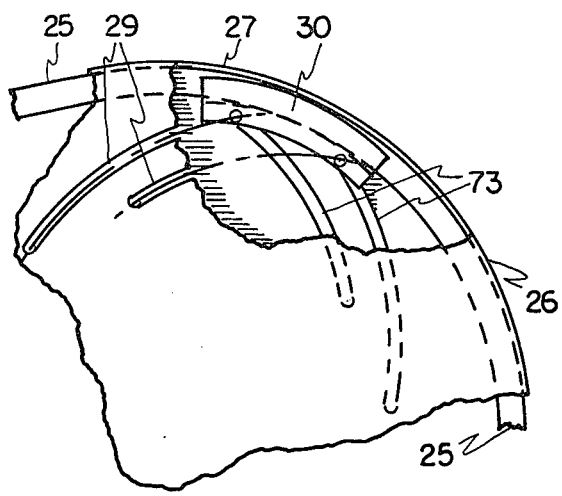
FIGS. 20-22 inclusive are enlarged partially cut away views of the portions enclosed respectively by lines 20, 21 and 22 of FIGS. 19a, 19b and 19c.
Figure 19B:
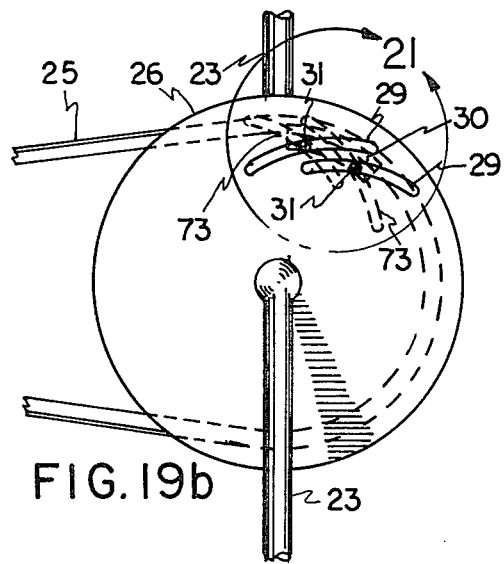
Figure 21:
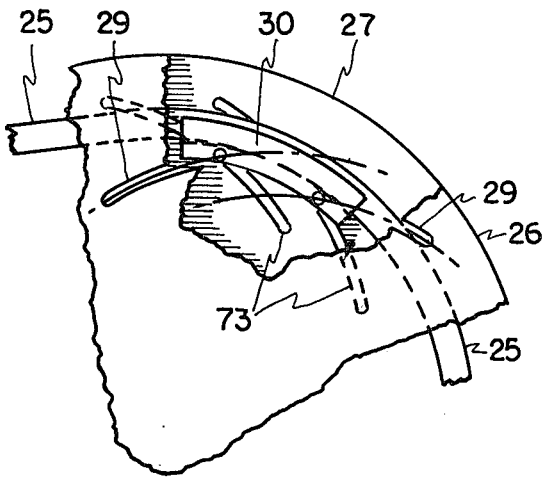
Figure 19C:
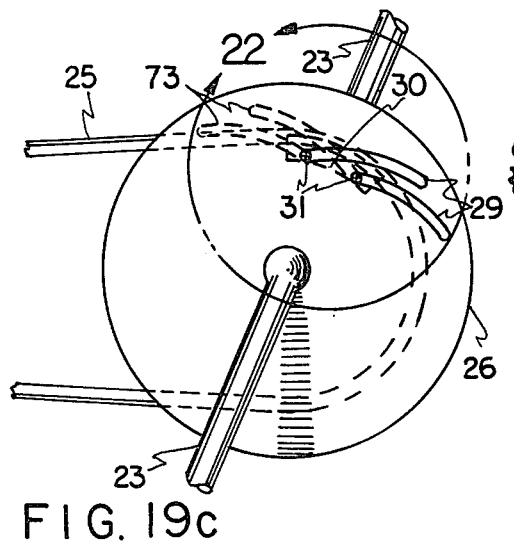
Figure 22:
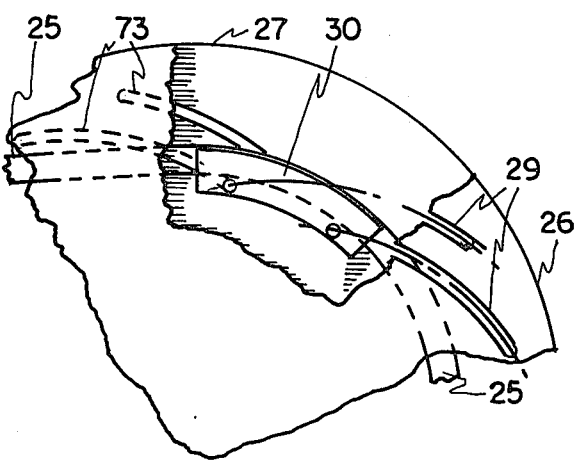
Figure 23A:
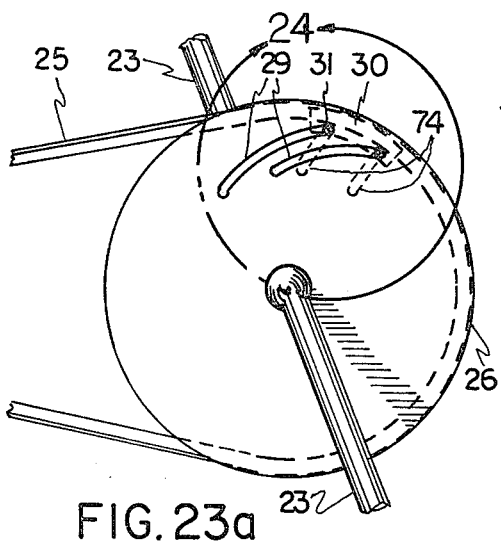
FIGS. 23a, 23b and 23c but of a modified pulley in which the straight cam slots are positioned differently from those of the pulley shown in FIGS. 15a, 15b and 15c.
Figure 24:
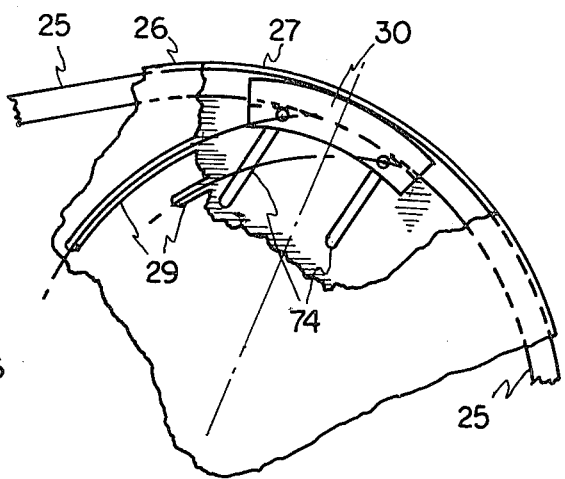
FIGS. 24-26 inclusive are enlarged partially cut away views of the portions enclosed respectively by lines 24, 25 and 26 of FIGS. 23a, 23b and 23c.
Figure 23B:
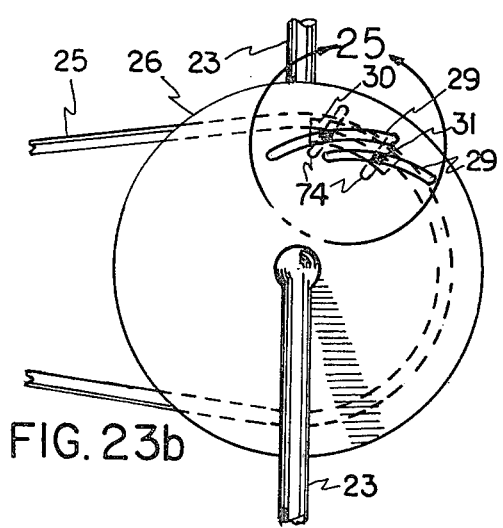
Figure 25:
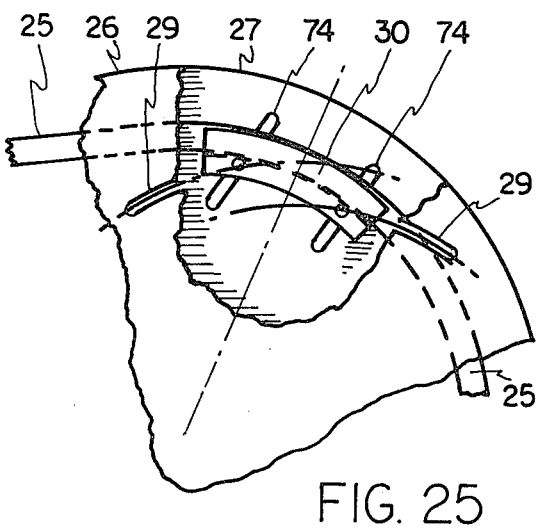
Figure 23C:
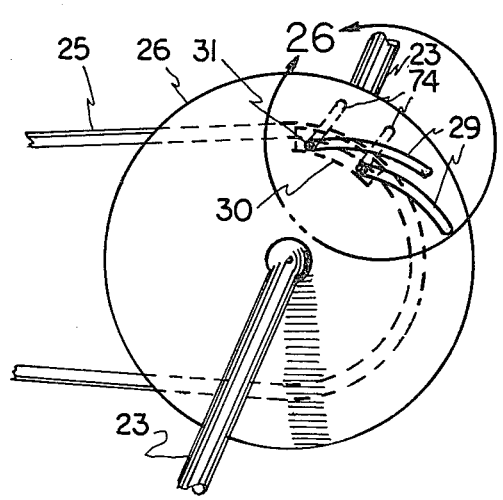
Figure 26:
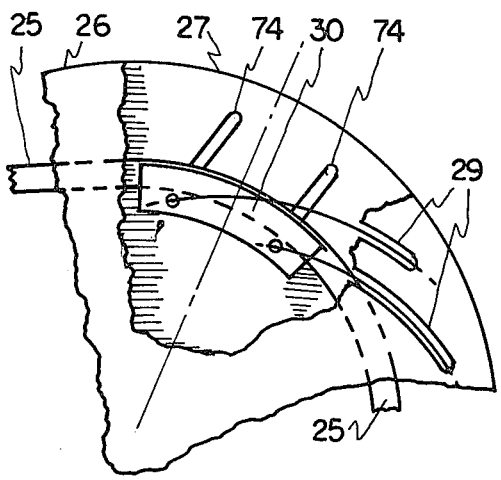
Figure 27A:
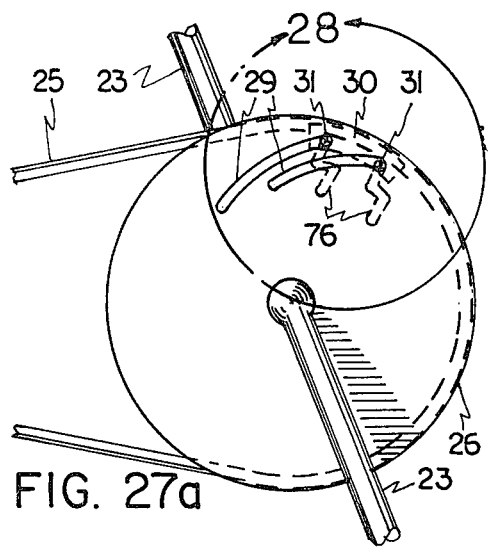
FIGS. 27a, 27b and 27c are views similar to FIGS. 15a, 15b and 15c but in which the cam slots in the movable plate 27 are zig-zag or stepped rather than continuous.
Figure 28:
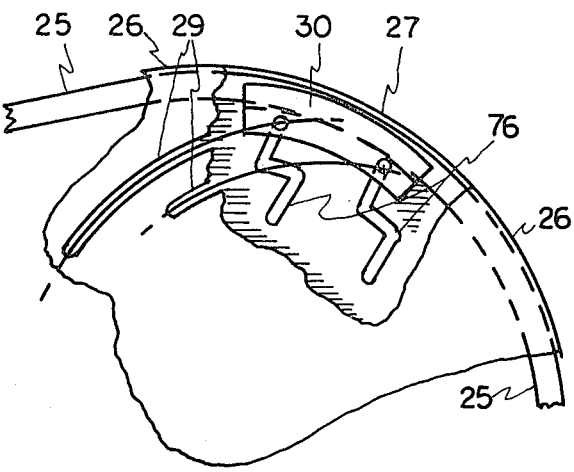
FIGS. 28-30 inclusive are enlarged partially cut away views of the portions enclosed respectively by lines 28, 29 and 30 of FIGS. 27a, 27b and 27c.
Figure 27B:
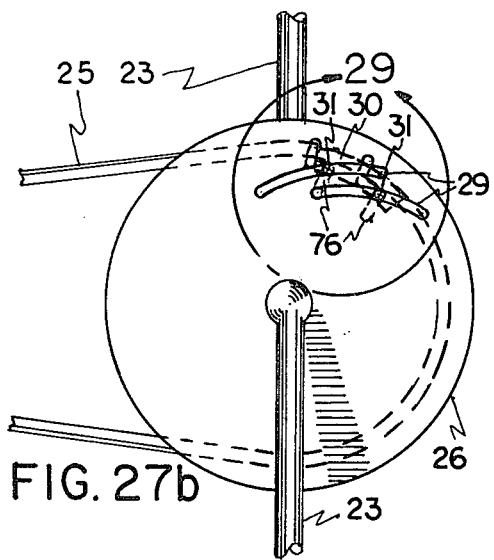
Figure 29:
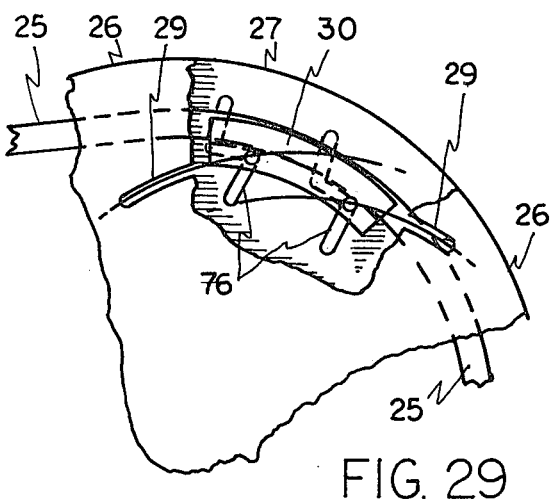
Figure 27C:
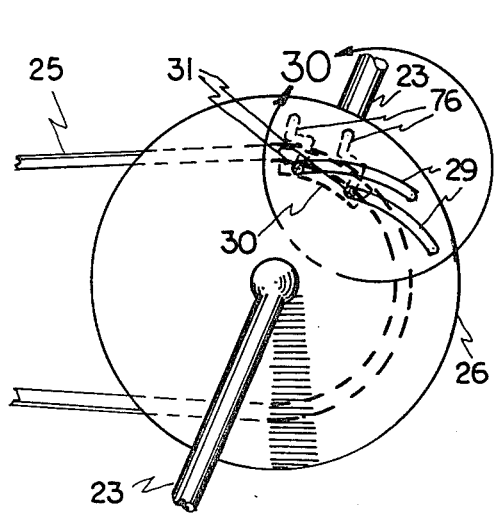
Figure 30:
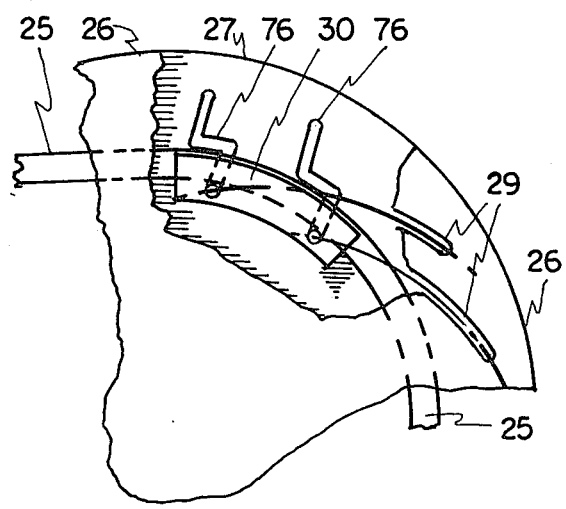
Figure 31A:
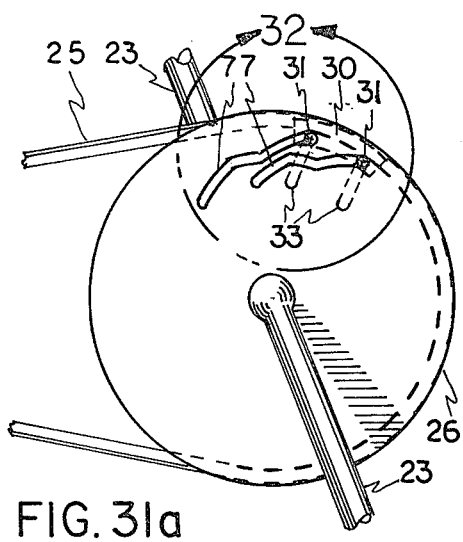
FIGS. 31a, 31b and 31c are views similar to FIGS. 15a, 15b and 15c but of a pulley embodying a modification in which the cam slots in the fixed plate are irregular to provide a stepped rather than continuous variation of pulley diameter.
Figure 32:
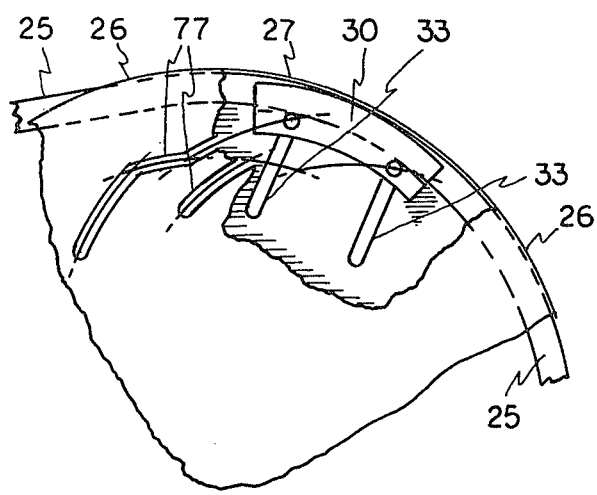
FIGS. 32-34 inclusive are enlarged partially cut away views of the portions enclosed respectively by the lines 32, 33, and 34 of FIGS. 31a, 31b and 31c.
Figure 31B:
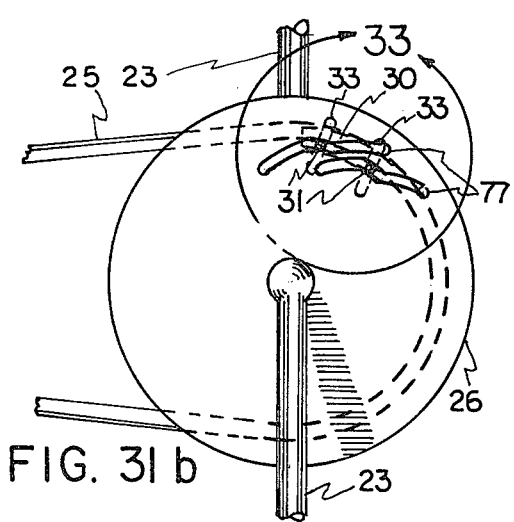
Figure 33:
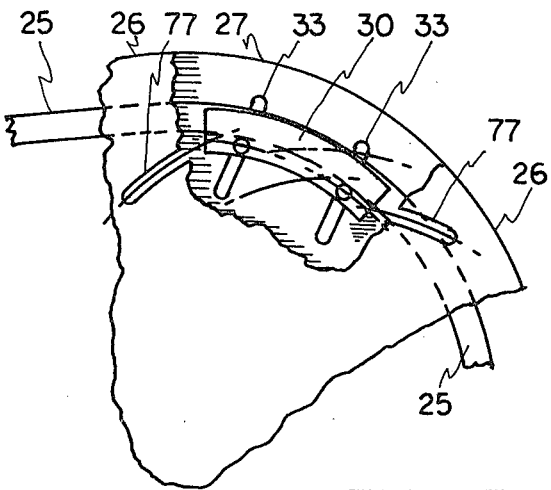
Figure 31C:
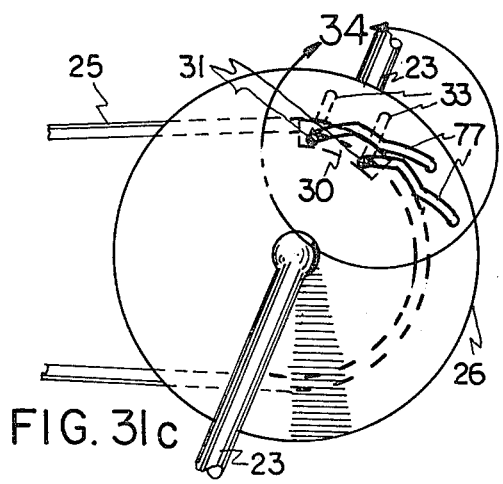
Figure 34:
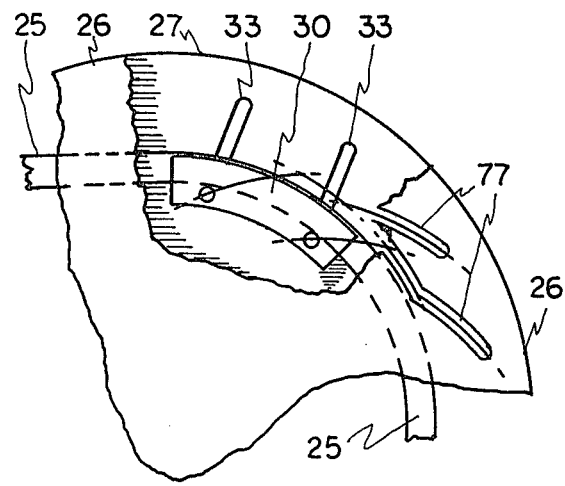

It is critical to proper operation that the arcuate belt-engaging segments move radially without tilting. Tilting causes loss of belt contact thus reducing drive efficiency due to belt slippage. Thus, the curves in both plates must be selected so that as the belt-engaging segments move along the curves the effective chord of the arcuate belt-engaging surface is always normal to a radius from the pulley axis. This relationship is illustrated in FIGS. 16–18 where the chord 81 is shown to be at a right angle to the pulley's radius 82 regardless of position of the segment in the slot. Care must be taken to ensure that it is the chords of the arcuate segments that are maintained normal to a radius of the pulley. The chord may not be the same as a line between the pins. However, a line between the pins whether or not normal to a radius, must maintain the same geometric relationship to a radius of the pulley.

In all embodiments shown in the drawings, a chord of the arcuate segments and a line between the pins coincide, but as noted, this is not necessary. Also, as shown, the pin ends 31 and 32 are directly opposite each other. This is convenient, but not necessary as the pairs of curves in the first and second sideplates may be offset from each other.

FIGS. 19–22 are similar to FIGS. 15–18, but show a construction in which the slots 73 in the movable plate 27 are simply the reverse of the curves 29 in the fixed plate 26. With the curved slots 73 a greater overload is required to move the arcuate sector inwardly. This is so because there must be more displacement of the spring when the arcuate segment follows a longer spiral path than when it follows the shorter radial path.

FIGS. 23–26 are similar to FIGS. 15–18 but the straight slots 74 in the movable plate 27 are not parallel to a radius of the pulley between them. Instead, one of the slots lies on a radius. In this position the slots 74 require a smaller load to decrease the pulley diameter than do either the curved slots 73 or the straight slots 33 of the embodiment shown in FIGS. 19–22, because as noted, a slot configuration that requires the smallest spring deflection for full travel of the arcuate segments will be the most sensitive to overload.

FIGS. 27–30 are similar to FIGS. 15–18, except that the illustrated embodiment employs a zig-zag slot 76 in the movable plate. This provides a dwell or a stepped speed change at one or more radial locations of the segment. That is, when overload is first applied, it will move the arcuate segment inwardly to that part of the slot 76 that is approximately parallel to the belt-engaging surface of the arcuate segment. If the overload has then been offset by spring deflection the arcuate segment will not move any further inwardly. On the other hand, if the overload is not offset by the spring, it will continue to deflect the spring until the arcuate segment has traversed the center part of the slot and if at that point the overload is still not offset by the spring the segment (by the pins in the slots) moves in along the inboard part of the slot to minimum diameter. Thus, although the movable plate rotates whenever there is an increased load not offset by the spring, when the segment is in a dwell position of the slots such plate movement will not cause radial movement of the segment so there will be no diameter change even though some spring deflection is occurring. In other words, there is a range of overload that can be accommodated at each dwell place without change in pulley diameter.

FIGS. 31–34 are similar to FIGS. 15–18, but illustrate an embodiment of the pulley in which an irregular slot 77 is provided in the fixed plate 26. The operation of this pulley will, like that illustrated in FIGS. 27–30, provide a dwell at one or more radial locations in the slot. At each dwell, there will be a range of overload at which no further inward shifting of the arcuate segment will occur, but once the load range of that dwell section is exceeded, inward shifting of the arcuate segment will resume.

Obviously, the number of dwell portions in the zig zag slot 76 of FIGS. 27–30 and the irregular slot 77 may vary according to the use to which the pulley and any drive embodying it are to be put.

As previously noted the slots in both the fixed and movable plates must be carefully defined so that the effective chord of each arcuate segment at all times defines a right angle with a radius from the pulley axis. An entirely suitable way to define the curves is to trace the path the pins or cam followers 31 take as they move outwardly while maintaining the necessary right angle intersection between such chord and pulley radius. The chord of the segment may be taken across the bottom of the V or, if the pins 31 and 32 are properly placed, a line between them can be used as the chord.

Figure 4:
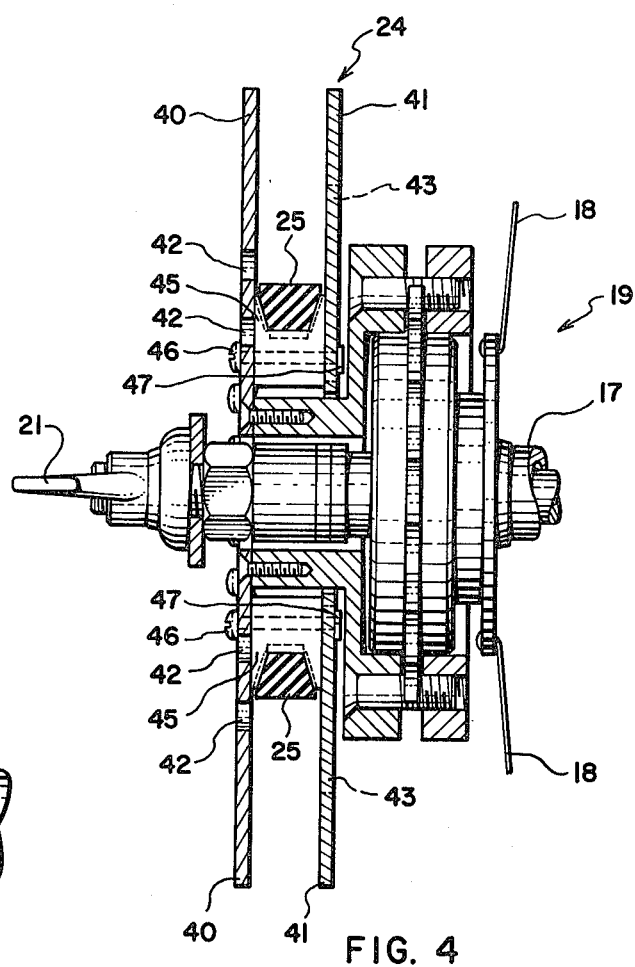
FIG. 4 is an enlarged sectional view taken in the plane of line 4—4 of FIG. 2 looking in the direction of arrows 4.

In the foregoing description, the large and small pulleys are described as having the same construction. This is not entirely correct. For instance, as shown in FIG. 11, the fixed and movable plates 40 and 41 are suitably secured to an axially offset plate that is in turn fastened to a free wheeling clutch assembly mounted concentrically to the rear shaft 17. The construction of FIG. 4 is similar.

Although the invention has been described in connection with the use of V belts and a bicycle drive system, it will be appreciated that other types of belts may be used and the pulley and drive systems employed in other vehicles or in industrial application.

I claim:

1. A variable diameter pulley comprising a hub, a first sideplate concentric to said hub and fixed thereto, a second sideplate concentric to said hub and rotatable about said hub relative to said first sideplate, a plurality of pairs of non-concentric curved slots in said first sideplate said slots extending outwardly and in the direction of rotation of said hub and first sideplate, a plurality of slots in said movable second sideplate said slots extending from an outer location adjacent the outer end of said curved slots in said first sideplate to an inner location adjacent the inner ends of said curved slots and said hub, a plurality of arcuate belt-engaging segments located between said first and second sideplates, a pair of pins extending laterally from the side of each of said arcuate segments facing said first sideplate, the pins of said pairs being spaced apart and located adjacent opposite ends of said segments and being received in the slots of one of said pairs of curved slots in said first sideplate, at least one pin extending laterally from the other side of each segment and received in a slot in said second sideplate, resilient means acting between said first and second sideplates to bias said second sideplate toward the position where said belt-engaging segments are at the limit of their outward travel in said slots, and said slots in said first and second sideplates being coordinated to the location of said pins on said arcuate segments so that at all radial locations of said pins in said slots a selected chord of each arcuate belt-engaging segment forms a right angle with a radius of said hub.

2. A variable diameter pulley according to preceding claim 1 in which said slots in said second sideplate are straight and arranged in pairs in which said slots are parallel to each other and to a radius of said pulley passing between said slots.

3. A variable diameter pulley according to preceding claim 1 in which there is provided a pair of first sideplates one of which is spaced from the other, and is adjacent said second sideplate, said arcuate segments are located between said pair of first sideplates and said pins extending from said segments are received in said slots in said pair of first sideplates and extend into said slots of said second sideplate.

4. A variable diameter pulley according to preceding claim 1 in which said slots in said second plate are curved and extend outwardly in a direction opposite to said slots in said first sideplate.

5. A drive system according to preceding claim 1 in which said resilient means comprises a horseshoe shaped spring.

6. A load-responsive drive system of the type having a driving pulley and a driven pulley functionally connected by an endless belt trained thereabout, each of said pulleys comprising a hub, a first sideplate concentric to said hub and fixed thereto, a second sideplate parallel to said first sideplate and concentric to said hub, said second sideplate being movable angularly about said hub relative to said first sideplate, a plurality of pairs of slots in said first sideplate, the slots of said pairs of slots in said first sideplate being curved and extending in non-concentric spaced-apart relationship outwardly in the direction of rotation of said sideplate, a plurality of slots in said second sideplate, a plurality of arcuate belt-engaging segments between said sideplates, a pair of laterally extending pins on each segment extending from the side of said segment facing the first sideplate the pins of said pairs being spaced apart and located adjacent opposite ends of said segment and being received in a slot of one of said pairs of curved slots in said first sideplate, at least one pin extending from the other side of each segment and received in a slot in said second sideplate; and said curved slots in said first sideplate and said pair of pins being coordinated so that upon relative motion between said first and second sideplates each of said arcuate segments is guided by said pins in said non-concentric curved slots in said first sideplate in a net radial movement during which a selected chord of the belt-engaging surface of said segment is maintained normal to a radius of said pulley; and resilient means in said driving pulley co-acting between said first and second sideplates biasing said sideplates angularly in a direction to urge said arcuate segments toward their radially outermost position.

7. A drive system according to preceding claim 6 in which said slots in said second sideplate are zig-zag whereby to provide steps in the radial movement of said belt-engaging segments.

8. A drive system according to preceding claim 6 in which in said driving pulley said curved slots in said first sideplate are formed as irregular curves thereby providing steps in the radial travel of said arcuate segments.

9. A drive system according to preceding claim 6 with the addition in said driven pulley of resilient means co-acting between said first and second sideplates biasing said sideplates angularly in a direction normally to maintain said arcuate segments in their radially outermost position.

10. A drive system according to preceding claim 6 in which said resilient means comprises a horseshoe shaped spring.

* * * * *